US008230190B1

(12) United States Patent
Cheok et al.

(10) Patent No.: US 8,230,190 B1
(45) Date of Patent: Jul. 24, 2012

(54) STORAGE DEVICE WITH BUILT-IN DATA SECURITY SYSTEM

(75) Inventors: Steven Tian Chye Cheok, Singapore (SG); Yong Peng Chng, Singapore (SG); Eng Kuan Ooi, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 1250 days.

(21) Appl. No.: 09/716,509

(22) Filed: Nov. 20, 2000

Related U.S. Application Data

(60) Provisional application No. 60/166,807, filed on Nov. 22, 1999.

(51) Int. Cl.
*G06F 12/14* (2006.01)
(52) U.S. Cl. ............................ 711/164; 711/112; 726/17
(58) Field of Classification Search .................. 711/111, 711/112, 163, 164; 713/1, 2, 200, 202
See application file for complete search history.

(56) References Cited

U.S. PATENT DOCUMENTS

| | | | | |
|---|---|---|---|---|
| 5,012,514 A * | 4/1991 | Renton | ......................... | 713/192 |
| 5,313,639 A | 5/1994 | Chao | ............................. | 395/725 |
| 5,375,243 A | 12/1994 | Parzych et al. | ............... | 395/725 |
| 5,544,083 A | 8/1996 | Iizuka et al. | ............. | 364/709.01 |
| 5,657,470 A | 8/1997 | Fisherman et al. | ........... | 395/480 |
| 5,799,145 A | 8/1998 | Imai et al. | ................. | 395/188.01 |
| 5,892,906 A * | 4/1999 | Chou et al. | .................... | 713/202 |
| 5,923,841 A | 7/1999 | Lee | ........................... | 395/188.01 |
| 5,949,601 A | 9/1999 | Braithwaite et al. | ............. | 360/60 |
| 5,951,687 A | 9/1999 | Chan et al. | ........................ | 713/2 |
| 6,012,145 A * | 1/2000 | Mathers et al. | ............... | 713/202 |
| 6,012,146 A * | 1/2000 | Liebenow | ...................... | 713/202 |
| 6,066,182 A * | 5/2000 | Wilde et al. | ...................... | 717/11 |
| 6,199,163 B1 * | 3/2001 | Dumas et al. | ................. | 713/183 |
| 6,212,635 B1 * | 4/2001 | Reardon | ....................... | 713/165 |
| 6,286,087 B1 * | 9/2001 | Ito et al. | ........................ | 711/164 |
| 6,351,817 B1 * | 2/2002 | Flyntz | ........................... | 713/202 |
| 6,357,000 B1 * | 3/2002 | Jain | .................................... | 713/1 |
| 6,367,017 B1 * | 4/2002 | Gray | ............................. | 713/200 |
| 6,401,205 B1 * | 6/2002 | Rallis et al. | .................. | 713/172 |

OTHER PUBLICATIONS

Hitachi, "New high capacity notebook hard disk drives from Hitachi", Aug. 1999, http://www.hitachi-eu-bsd.com/html/august_23_1999.html.*
"Proposal for Adding Secure Mode to ATA Specification," by Pete McLean, downloaded from http://fission.dt.wdc.com/ata.archive on Oct. 8, 2000.

* cited by examiner

*Primary Examiner* — Gary Portka
(74) *Attorney, Agent, or Firm* — Cesari & Reed, LLP; Kirk A. Cesari

(57) ABSTRACT

A fixed disc drive includes a built-in user level security system. The system includes instructions that create an user interface upon a computer allowing interaction with security features of the drive without relying upon BIOS compatibility. In a specific embodiment, the user level security interface is provided by the disc drive during the system boot sequence. A method of disc drive security includes receiving a request from a computer to provide an operating system, and responsively providing user level security interface instructions. The user level security instructions are then executed by the computer to generate a user level security interface. If the drive is in a locked state, the interface requires an user to provide an acceptable password otherwise access to data on the drive is forbidden or otherwise restricted.

22 Claims, 5 Drawing Sheets

STORAGE DEVICE WITH BUILT-IN DATA SECURITY SYSTEM

CROSS-REFERENCE TO CO-PENDING APPLICATION

This application claims the priority of earlier filed co-pending Provisional Patent Application No. 60/166,807, filed Nov. 22, 1999 and entitled BUILT-IN DRIVE SECURITY PASSWORD SYSTEM.

FIELD OF THE INVENTION

The present invention relates generally to data storage devices. More particularly, the present invention relates to a disc drive with a built-in security password system.

BACKGROUND OF THE INVENTION

Mass storage devices are one of many components of modern computers. One type of mass storage device is the fixed disc drive. Such drives are used to store vast amounts of information relating to operating systems, applications, and user data. Most companies or individuals use electronic information extensively to support their daily business processes. Sensitive data on customers, products, contracts, financial results, and accounting are often stored on a fixed disc drive. If the confidentiality of this sensitive information were compromised, significant losses could occur. Thus, it is sometimes very important to ensure the confidentiality of data stored in a disc drive such that only authorized persons have access to the data.

Drive security has become even more important as fixed disc drives have become more interoperable and mobile. For example, a drive conforming to the AT Attachment Specification will operate with any system that supports the AT Attachment Specification. Modern systems generally detect fixed disc drives automatically and allow access with relative ease. With such systems drives can be swapped between systems with little effort.

As others have recognized the importance of drive security, disc drive security systems have been proposed to limit access to sensitive or confidential information. However, such systems require cooperation between the system Basic Input/Output System (BIOS) and drive firmware in order to enable/disable security features. This creates a significant problem where one system includes a BIOS that can enable security features on a drive, and a second system (typically an older system) does not include BIOS that can interact with the security features. Another situation in which this problem arises, is when a given disc drive supports security features, such as the ATA5 Security Mode, and the system BIOS's do not support such features. For example, most BIOS' do not currently support the ATA Security Mode feature. Thus, incompatibilities occur that limit the interoperability and mobility of fixed disc drives with security features.

The present invention addresses these and other problems, and offers other advantages over the prior art.

SUMMARY OF THE INVENTION

The present invention relates to fixed disc drives which solve the above-mentioned problems.

In accordance with one embodiment of the invention, a fixed disc drive includes a built-in user level security system. The system includes instructions that create an user interface upon a computer thereby allowing user interaction with security features of the drive without relying upon system BIOS compatibility. In a specific embodiment, user level security interface software is provided by the disc drive during the boot sequence of the computer system.

In another embodiment of the present invention, a method of disc drive security includes receiving a request from a computer to provide an operating system, and responsively providing user level security interface instructions. The user level security instructions are then executed by the computer to generate an user level security interface. If the drive is in a locked state, the interface requires the user to provide an acceptable password, otherwise access to data on the drive is forbidden or otherwise restricted.

In another embodiment a disc drive includes a system for reading data from and writing data to at least one disc. The drive also includes a system for generating a user level security interface to access one or more security features of the drive.

DETAILED DESCRIPTION OF ILLUSTRATIVE EMBODIMENTS

Figure 1:
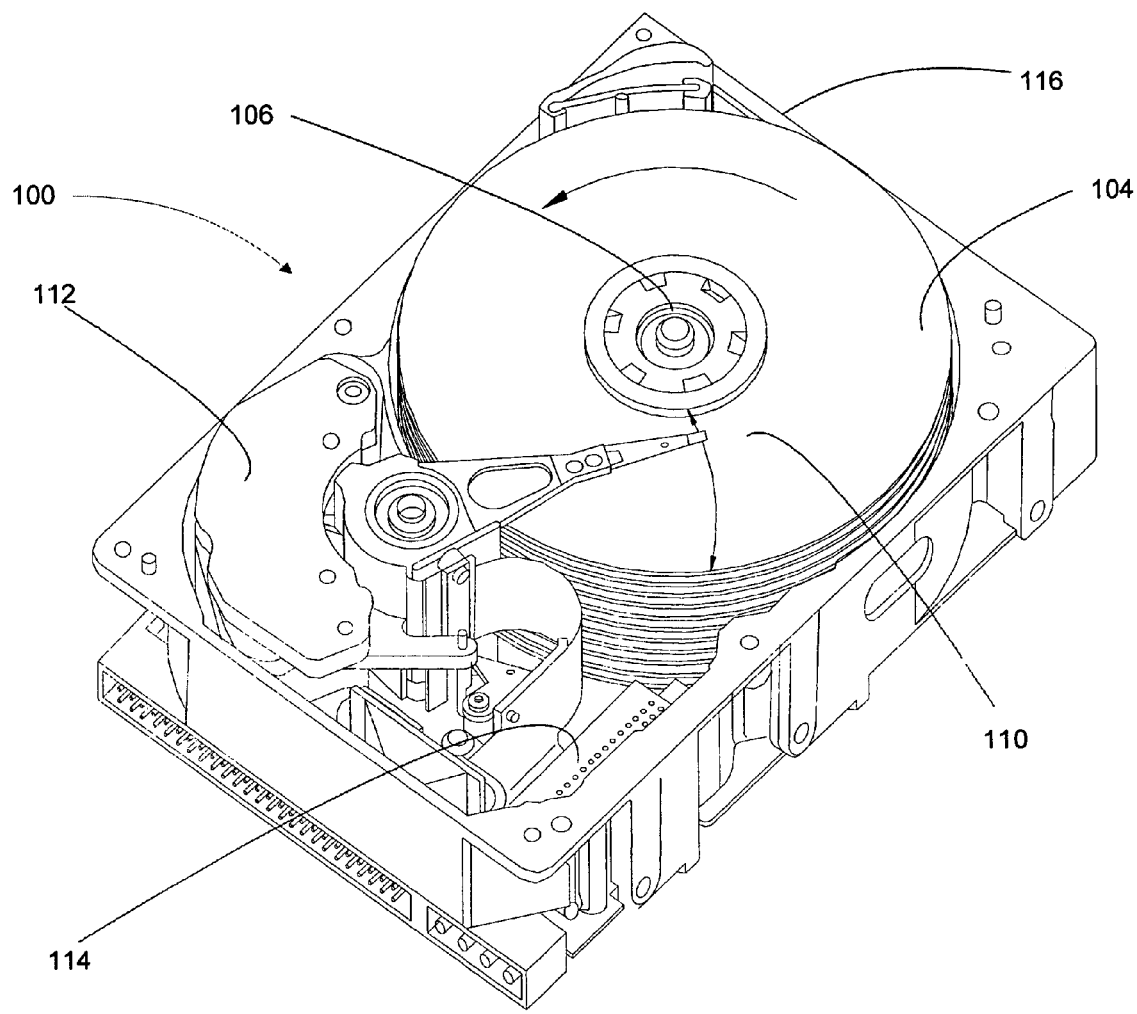
FIGS. 1 and 2 are diagrammatic and system block views, respectively, of an exemplary fixed disc drive for which embodiments of the present invention are useful.
Figure 2:
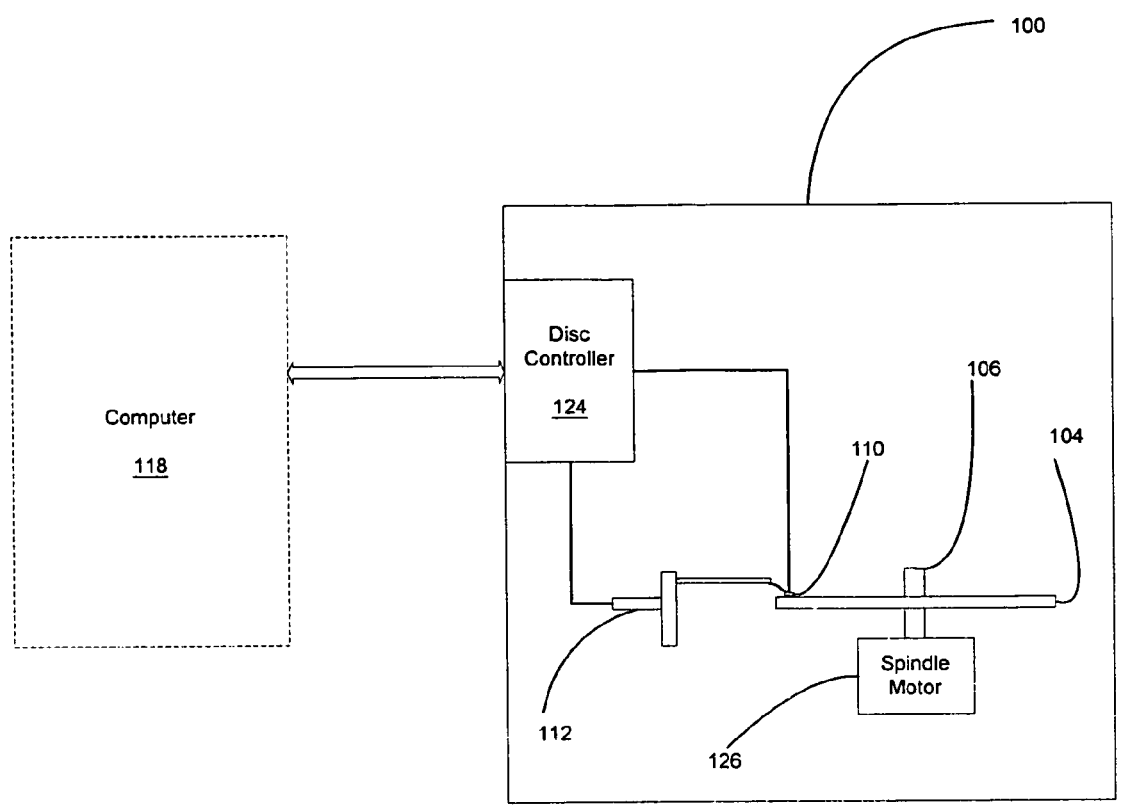

FIG. 1 is a diagrammatic view of disc drive 100, which is adapted to couple to a computer 118 (shown in FIG. 2). When disc drive 100 is coupled to computer 118, computer 118 transfers data to and reads data from disc drive 100. Disc drive 100 includes discs 104, spindle 106, spindle motor 126 (shown in FIG. 2), transducer head 110, actuator 112, end board electronics 114, and enclosure 116. Board electronics 114 include disc controller 124 (shown in FIG. 2).

Discs 104 are fixed about spindle 106, which is coupled to spindle motor 126 such that energization of spindle motor 126 causes spindle 106 and discs 104 to rotate. When discs 104 rotate, heads 110 fly above/below discs 104 on thin films of air or liquid and carry heads 110 for communicating with the respective disc surface. Several alternative types of heads can be used, such as magnetic or optical heads. Actuator 112 is coupled to controller 124 and is adapted to move heads 110 relative to the surfaces of discs 104 in response to an actuation signal from controller 124.

Figure 3:
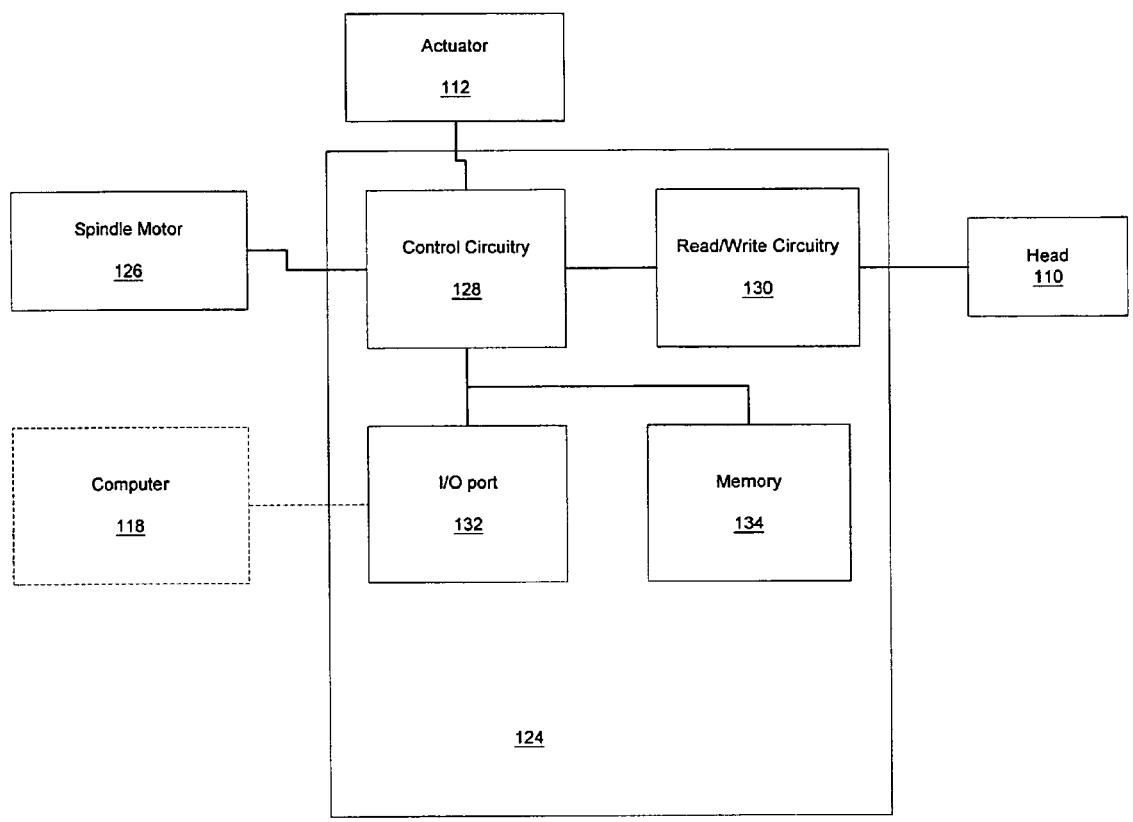
FIG. 3 is a system block diagram of a disc drive controller in accordance with an embodiment of the present invention.

FIG. 3 is a block diagram of disc controller 124 in accordance with an embodiment of the present invention. FIG. 3 shows disc controller 124 coupled to computer 118, spindle motor 126, actuator 112, and transducer head 110. FIG. 3 further shows disc controller 124 comprised of read/write circuitry 130, I/O port 132, control circuitry 128 and memory 134.

Control circuitry 128 provides an energization signal to spindle motor 126, and provides an actuation signal to actuator 112. Thus control circuitry 128 essentially controls all motion in drive 100. Control circuitry 128 also provides information which is to be written to discs 104, to read/write circuitry 130, and receives information read from discs 104 from read/write circuitry 130. Control circuitry 128 is adapted to receive a request from I/O port 132 to read information from or write information to a specific address corresponding to a physical location within drive 100. Control circuitry 128 provides appropriate actuator and energization signals to position transducer head 110 over the specified location on disc 104. Once positioned, information is written to or read from discs 104 according to the request received from I/O port 132.

Figure 4:
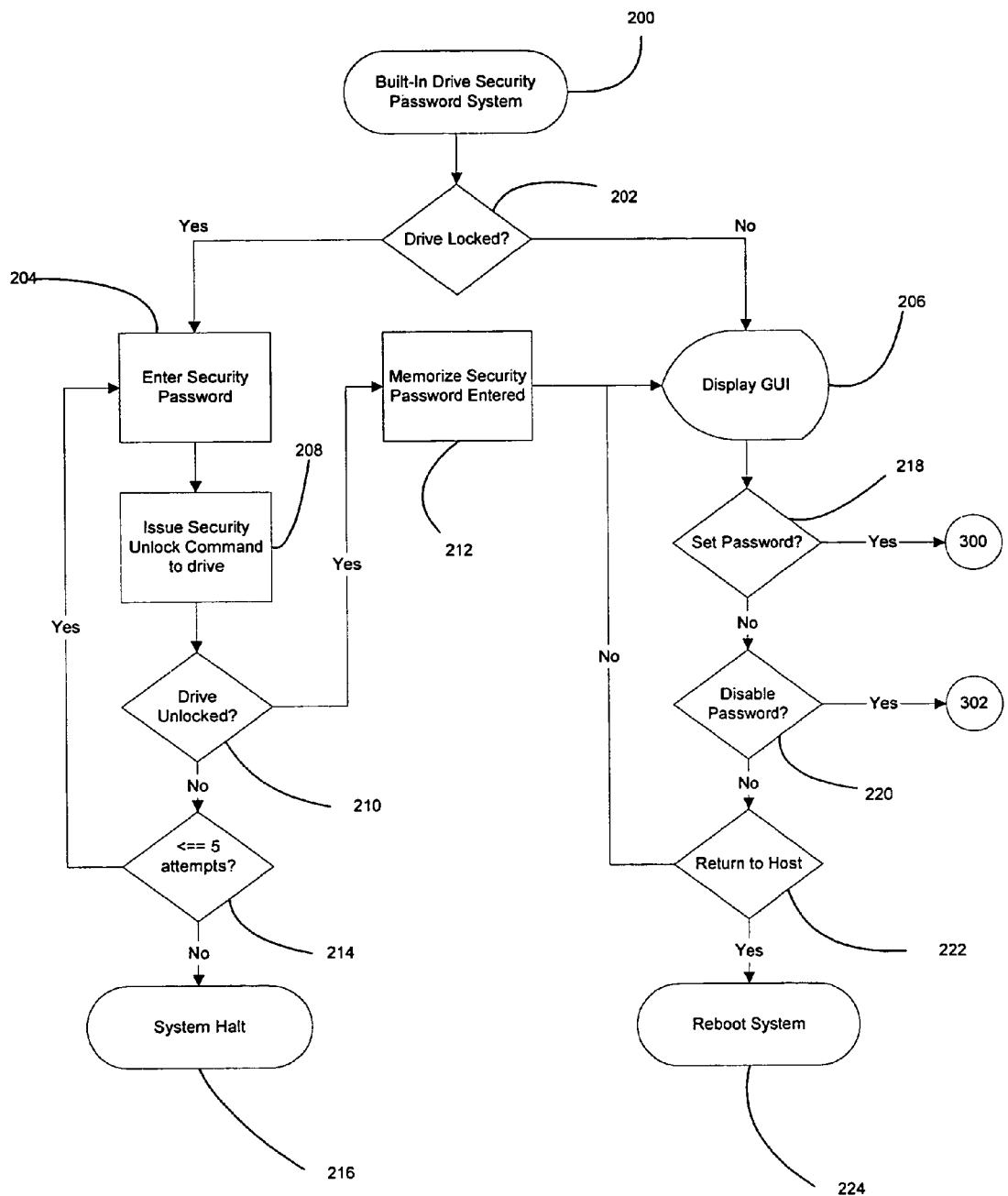
FIGS. 4 and 5 are system block diagrams of a method of providing a built-in user level security interface in accordance with an embodiment of the present invention.
Figure 5:
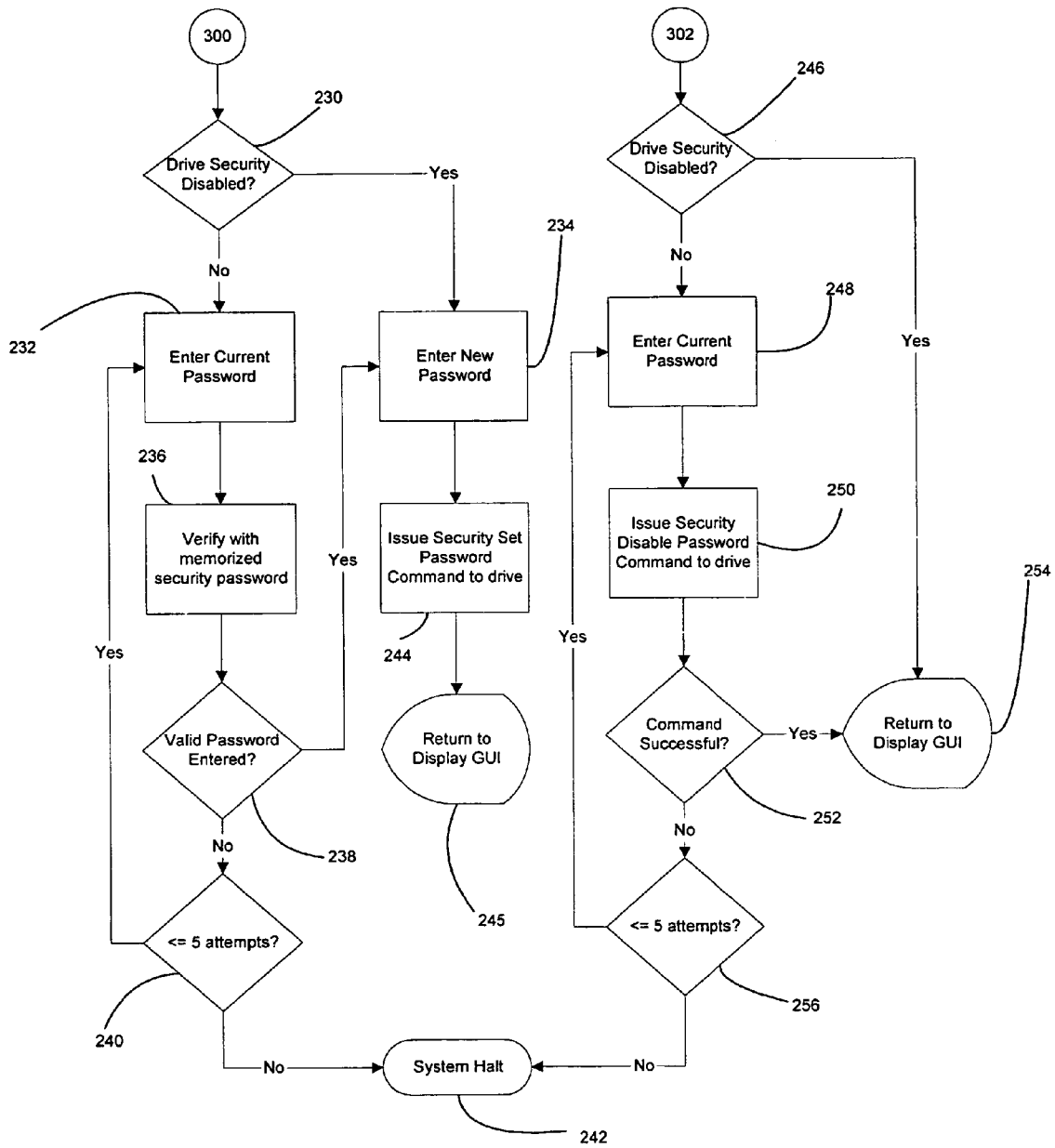

I/O port 132 is adapted to communicate commands and data between system 118 and drive 100. Some commands are issued by computer system 118 during the boot sequence of computer system 118. One such boot command, issued by computer 118, generally instructs storage devices such as drive 100 to provide an operating system to computer 118. When this command is issued by computer system 118, I/O port 132 receives the command, and provides the command to control circuitry 128. Control circuitry 128 recognizes this specific command, and provides user level security interface software, which in one embodiment resides in memory 134 and/or on disc 104 to computer 118 through I/O port 132 instead of the system-requested operating system. Upon execution of the user level security interface software, computer system 118 causes a user interface to be displayed which provides access to security features of the drive. "Security Features," as used herein, is intended to mean any features that directly or indirectly provide selectable access to data on drive 100. Upon termination of the user level security interface, control circuitry 128 provides an operating system to computer 118 through I/O port 132 much as would any prior art storage disc FIGS. 4 and 5 illustrate a method of providing user level security access in accordance with an embodiment of the present invention. The method begins at step 200 where the built-in security password system is invoked by system 118. Preferably, this invocation is generated during system boot, however those skilled in the art will recognize that invocation may be effected at other appropriate times as well. Once the password system has been invoked, control passes to state 202 which determines if drive 100 is in a locked state. This determination can be done in a number of ways, for example, drive 100 can query a non-volatile portion of memory 134 to determine if a Security Set Password command has been issued to cause a password to be stored within memory 134. Another alternative includes checking a location on disc(s) 104 that stores security information. In such an embodiment, security information is generally written upon a location of discs 104 that is always inaccessible to users, thus the hidden location functions as the non-volatile portion of memory 134. If drive 100 is locked, control passes to block 204. However, if drive 100 is not locked, control passes to block 206.

At block 204, the user level security interface prompts the user to enter the security password. Control then passes to block 208 where the Security Unlock command is sent to drive controller 128 along with the user-supplied password. If the user-supplied password matches the stored password recorded when the drive was locked, the Unlock command is successful and the drive becomes unlocked. However, if there is no match, the Unlock command fails and drive 100 remains locked. At state 210, the status of drive 100 is checked to see if it remains locked. If the drive is unlocked then control passes to state 212 where the entered security password is memorized, and where control is passed to state 206. However, if drive 100 remains locked, then control passes to state 214 where a counter is incremented and checked to see if a pre-selected number of unsuccessful unlock attempts have occurred. In FIG. 4, the preselected number is five attempts. If the number of unsuccessful attempts reaches the preselected threshold, then control passes to state 216 where the system is halted. Once system 118 is halted, the system must be reset in order for drive 100 to provide any user level security interface.

At block 206, drive 100 generates an user interface that allows a user to set a new password, disable password protection, or return to the host system. In one embodiment, the user interface generated at block 206 is a graphical user interface. Once the interface is displayed, the user is prompted to provide a command related to the above options. At state 218, the command is evaluated to see if it is a request to set the password. If the command is indeed such a request, control passes to circle 300 which is set forth in detail in FIG. 5, which will be discussed later in the specification. If the user command is not Set Password, then the command is evaluated, in state 220, to see if it is a Disable Password command. If the command is in fact a Disable Password command, then control passes to circle 302 which is also set forth in detail in FIG. 5. If the user command is neither Set Password nor Disable Password, then the command is checked at state 777 to see if it is a request to Return to Host. If so, control passes to state 224 where the operating system is provided to computer 118 and the boot process resumes as normal.

Circle 300, shown in FIG. 5, represents the state of drive 100 when an user has entered a command to Set Password at the user interface prompt of block 206. The method begins at state 230 where the system determines whether drive security is disabled. If drive security is not disabled, then control passes to block 232, otherwise control passes to block 234. At block 232, the user interface prompts the user to enter the Current Password. At block 236, the Current Password and memorized security passwords are compared in order to verify user authorization. If the user has entered the correct password, then state 238 passes control to block 234, otherwise control passes to state 240 where a count of unsuccessful attempts is incremented and checked against a preselected threshold, much like state 214 in FIG. 4. Once the number of preselected unsuccessful attempts has been reached, control passes to state 242 where system 118 is halted.

As illustrated in FIG. 5, block 234 can receive control from state 230 as well as state 238. Block 234 prompts the user to enter the New Password. Once the user has entered the New Password, control passes to to block 244 where the Security Set Password command is issued to drive 100, after which control returns to state 206 through state 245.

Circle 302 represents the state of drive 100 when a user has entered a command to Disable Password at the user interface prompt of block 206. The method begins at state 246 where the system determines whether drive security is disabled. If drive security is disabled, then there is no reason to further execute the method, and control is returned to the user interface of state 206. However, if drive security is not disabled, then control passes to block 248, which functions identically to block 232. At block 250, a Security Disable Password command is sent to drive 100 with the user-supplied password. At state 252, the system checks to see whether the command was successful. If the command was successful, then control returns to the user interface of block 206 through state 254. However, if the command was not successful, then control passes to state 256 which functions similarly to state 240 in that unsuccessful attempts are counted, such that when the preselected number of unsuccessful attempts is reached, control passes to state 242 where the system halts.

The embodiments described above allow an user to access a user level security interface on the drive without relying upon system BIOS compatibility. This stand-alone capacity of the drive facilitates interoperability as well as mobility of drives that contain sensitive or confidential information.

In conclusion, a disc drive 100 is disclosed including a built-in drive security system. The drive 100 generally includes at least one disc 104 having a disc surface. A spindle motor 126 is coupled to the disc 104 for causing rotation of the disc 104. A head 110 reads information from the surface of the disc 104. An actuator 112 is coupled to the head 110 for responsively positioning the head 110 over the surface of the at least one disc 104. A non-volatile memory 134 contains security state information. A disc controller 124 within the drive 100 includes control circuitry 128 coupled to the non-volatile memory 134, the spindle motor 126 and the actuator 112 for controlling operation of the drive 100 in response to security state information. The disc controller 124 also includes read circuitry 130 coupled to the head 110 to receive information from the head 110. An Input/Output (I/O) port 132 is coupled to the control circuitry 128 and the computer 118 such that information can be transferred between the I/O port 132 and the computer 118 to provide user level security interface software to the computer 118. The interface software, when executed by the computer 118, generates an user level security interface upon the computer 118, which interface allows selectable access to data on the at least one disc 104 based upon user input from the user level security interface and the security state information. The interface software can be stored in the non-volatile memory 134. The drive 100 can include built in security features that operate with compatible BIOS, while using the built-in interface for computers having BIOS's that do not support the built-in security features. One example of a built-in security feature is the ATA5 Security Mode feature. The built-in interface can allow authorized users to change passwords as well as disable drive security. The user interface can count unsuccessful access attempts and halt operation of the computer 118 if the number of unsuccessful attempts reaches a preselected threshold.

In accordance with another aspect of the invention, a method includes a number of steps for providing security on a disc drive 100. One step receives a request from the computer 118 for the disc drive 100 to provide an operating system to the computer 118. Another step responds to the computer's request by providing user level security interface software instead of the operating system. The computer executes the interface software and generates an interface that allows user level security information to be modified by an authorized user. Upon termination of the user interface, the drive provides the requested operating system and the boot process resumes.

It is to be understood that even though numerous characteristics and advantages of various embodiments of the present invention have been set forth in the foregoing description, together with details of the structure and function of various embodiments of the invention, this disclosure is illustrative only and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the spirit and scope of the present invention. Further, although embodiments of the present invention have been described with respect to a single password and absolute access, it is expressly contemplated that any suitable number of passwords can be provided any varying degrees of user access can be allowed in response thereto. Additionally, different users can be granted access to different physical or logical portions of the disc drive depending on their individual passwords.

What is claimed is:

1. A device comprising:
   a data storage device including the following elements that are non-removable from the data storage device:
      a data storage interface configured to couple the data storage device to a host computer system to allow the data storage device to be removable from the host computer system, the data storage interface also configured to receive commands to store data to and retrieve data from the data storage device;
      a data storage medium to store data from the host computer system;
      a non-volatile memory which stores security state information;
      a controller operably coupled to the memory; and
   the data storage device also including security software stored within the data storage device on the data storage medium or the non-volatile memory, wherein the security software is executable by the controller and implemented independent of a Basic Input/Output System (BIOS) of the host computer system and the security software is programmed to execute a security software interface, via the host computer system but independent of the BIOS, that allows the input of a password, compare the password with the security state information, and determine whether to deny the host computer system access to the data storage medium based on the comparison.

2. The device of claim 1 wherein the security software is stored in non-volatile memory of the data storage device.

3. The device of claim 1, wherein the security software, independent of the BIOS, allows an authorized user to modify the security state information so that prior to said modification a first password results in a grant of access to said data storage medium, and wherein after said modification the first password results in a denial of access to said data storage medium.

4. The device of claim 1, wherein the security software, independent of the BIOS, allows an authorized user to disable the security software.

5. The device of claim 1, wherein the data storage device comprises a disc drive which operates in accordance with ATA-5 specification.

6. The device of claim 1, wherein the controller is configured to execute the security software in response to an access command from the host computer system to transfer data from the data storage medium to the host computer system.

7. The device of claim 6, wherein the access command comprises a command to transfer an operating system from the data storage medium to the host computer system.

8. The device of claim 1, wherein the data storage device further comprises an enclosure in which at least the data storage medium is disposed and to which the data storage interface is attached, and wherein the host computer system is external to and removable from said enclosure.

9. A storage device comprising:
   an enclosure;
   a data storage interface coupled to the enclosure, configured to provide communication between the data storage device and a host computer system, configured to be removable from the host computer system, and also configured to receive commands from the host computer system to store data to and retrieve data from the data storage device;
   a data storage medium disposed within said enclosure;
   a memory storing security software;
   a controller that can execute the security software to:

authorize or deny a transfer of selected data from the data storage medium to the host computer system, which is external to and removable from the enclosure, in response to an access command from the host computer system to transfer said selected data between the data storage medium and the host computer system;

provide a security software interface to a user prompt, via the host computer system but independent of a Basic Input/Output System (BIOS) of the host computer system, that allows the input of a password to determine when to authorize or deny a transfer; and the security software is loaded from the memory and implemented independent of a Basic Input/Output System (BIOS) of the host computer system.

10. The storage device of claim 9, further comprising data transfer circuitry configured to transfer the selected data between addressable data sectors of the medium and the host computer system in response to authorization by the controller.

11. The storage device of claim 9, wherein the controller is mounted to an external surface of the enclosure.

12. The storage device of claim 9, wherein the enclosure is characterized as a first enclosure, wherein the host computer system comprises a second enclosure, and wherein the first enclosure is configured to be disposed within the second enclosure.

13. The storage device of claim 9, wherein the security software is configured to execute an interface that allows the input of a password, compare the password with security state information stored within the storage device, and determine whether to deny the host system access to the selected data based on the comparison.

14. The storage device of claim 9, wherein the access command comprises a command to transfer an operating system from the medium to the host computer system.

15. The storage device of claim 9, wherein the device operates in accordance with ATA-5 specification.

16. A method comprising:
receiving an access command at a data storage device from a host system;
using a controller of the data storage device to execute security software stored within the data storage device to:
provide a security interface to a user prompt, via the host system but independent of a Basic Input/Output System (BIOS) of the host system, that allows input of a password to determine when to authorize or deny a transfer of data from the data storage device.

17. The method of claim 16, further comprising the security software configured for executing an interface that allows the input of a password, comparing the password with security state information stored within the storage device, and determining whether to deny the host system access to data based on the comparison.

18. The method of claim 16, wherein a transfer comprises an operating system for the host system.

19. The method of claim 16, wherein the host system is characterized as a first host system, and wherein the method further comprises steps of decoupling the data storage device from the first host system, subsequently coupling the data storage device to a different second host system, and repeating the receiving and using steps with the second host system.

20. The method of claim 19, wherein the first host system has a first BIOS, and wherein the second host system has a second BIOS different from the first BIOS.

21. An apparatus comprising a data storage device which stores a security software routine which is executed by a controller within the data storage device in response to a data access command, said execution presenting a security interface to a user of a the host system that requires an input of a password by the user for the security software routine to determine whether to authorize the transfer of the selected data to the host system and wherein the security software routine is stored wholly within the data storage device and the security interface is presented to a user via the host system but independent of a Basic Input/Output System (BIOS) of the host system.

22. The apparatus of claim 21, wherein the data comprises an operating system used by the host system, and wherein the operating system is supplied to the host system only if the user correctly inputs said password.

* * * * *